United States Patent

Mita

[15] 3,695,159
[45] Oct. 3, 1972

[54] REFLEX CAMERA WITH AUTOMATIC EXPOSURE CONTROL

[72] Inventor: Kunio Mita, Tokyo-to, Japan

[73] Assignee: Asahi Kogaku Kogyo Kabushiki Kaisha, Tokyo, Japan

[22] Filed: June 9, 1969

[21] Appl. No.: 831,485

[30] Foreign Application Priority Data

June 20, 1968    Japan .....................43/42214

[52] U.S. Cl. .....................95/10 C, 95/42, 95/53 EB
[51] Int. Cl. ........G03b 7/08, G03b 9/58, G03b 19/12
[58] Field of Search...........95/10 C, 53, 53 E, 42, 64, 95/64 B, 10 CT, 53 EA, 53 EB

[56] References Cited

UNITED STATES PATENTS

| | | | |
|---|---|---|---|
| 3,533,348 | 10/1970 | Akio Yanagi | 95/42 X |
| 3,303,766 | 2/1967 | Karikawa et al. | 95/10 C |
| 3,324,779 | 6/1967 | Nobusawa et al. | 95/42 |
| 3,336,850 | 8/1967 | Otani et al. | 95/10 C |
| 3,349,678 | 10/1967 | Suzuki et al. | 95/10 C |
| 3,442,190 | 5/1969 | Erickson | 95/10 C |
| 3,442,192 | 5/1969 | Sato | 95/42 |
| 3,498,195 | 3/1970 | Ono | 95/10 C |

*Primary Examiner*—Joseph F. Peters, Jr.
*Attorney*—Stanley Wolder

[57] ABSTRACT

An automatic exposure timing system in a single lens reflex camera with a through the lens light measuring system includes a memory device and a shutter timing network. A first switch alternatively connects the memory device to the light measuring or timing network and a second switch connects a battery to the light measuring system and timing network. A mirror return release member sequentially closes the second switch, actuates the first switch to connect the memory device to the timing network, and releases the mirror. The mirror return sequentially releases the automatic diaphragm and the shutter, and blocks the light measuring photocell. Closing of the shutter returns the switches to their initial condition.

8 Claims, 3 Drawing Figures

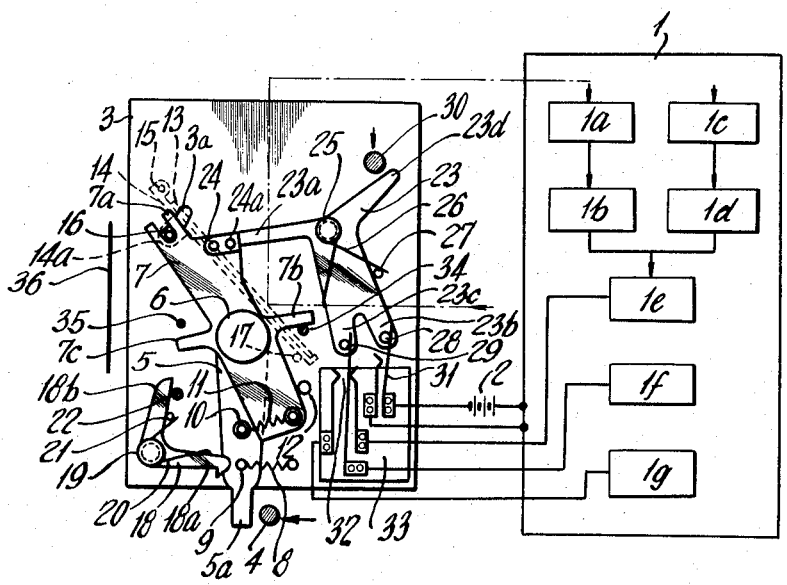
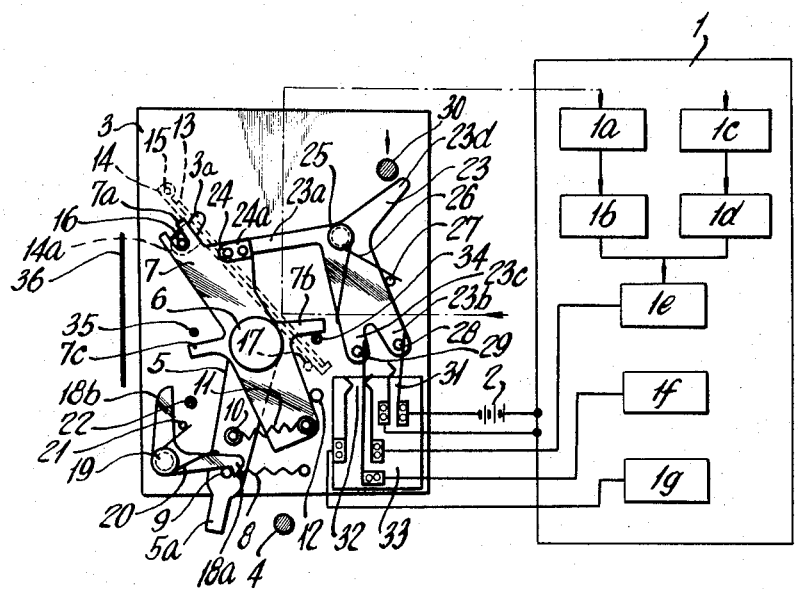

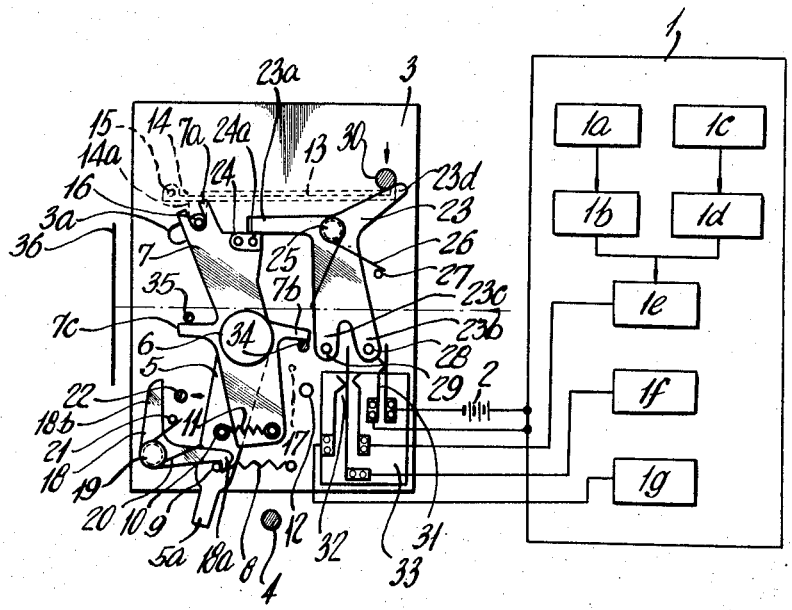

REFLEX CAMERA WITH AUTOMATIC EXPOSURE CONTROL

BACKGROUND OF THE INVENTION

The present invention relates generally to improvements in the automatic timing of a shutter in a single lens reflex camera provided with a through the lens light measuring system and it relates particularly to an improved control mechanism for a light controlled shutter timing network with a through the lens light measuring system wherein an electric parameter corresponding to the measured light is stored in a memory device and is employed as a control for the shutter timing network.

In an external light receiving type electric shutter automatic timing mechanism, the object light rays which do not traverse the objective are directly received by a light responsive element and the exposure time is determined in response to an electric parameter, for example the resistance value of a photoconductor when a photoconductor is employed as the light responsive element. Accordingly, with such external light receiving type automatically timed shutter, the light rays incident upon the light responsive element are not blocked during the shutter release operation so that it is not necessary to memorize the resistance value of the photoconductor upon release operation.

With the electric shutter of a TTL type camera, however, during the shutter release operation the light responsive element is either withdrawn from the incident light path, or, in the case of a single lens reflex camera, shielded by a mirror or a shielding plate. Therefore, prior to the photographing operation it is necessary to temporarily memorize the resistance value of the element by means of a memory circuit, so as to determine the proper exposure time for shutter operation.

Networks for automatic light controlled electric shutters in TTL type cameras have been disclosed. In the operation of these networks it is necessary to effect a predetermined sequence of operations. First the current source switch is closed, then the resistance value of the light responsive element corresponding to the object brightness is memorized by means of a measurement circuit and a memory circuit, and finally, prior to withdrawal of said element from the light path or swing-up movement of the mirror, a change over operation must be carried out from the measurement circuit to the timing circuit.

The systems for effecting the sequence of operations heretofore proposed possess numerous drawbacks and disadvantages. They are awkward, complex and unreliable mechanisms which leave much to be desired.

SUMMARY OF THE INVENTION

It is a principal object of the present invention to provide an improved light controlled automatic shutter control mechanism.

Another object of the present invention is to provide an improved through the lens light controlled automatic shutter control mechanism.

Still another object of the present invention is to provide an improved control mechanism for an automatically time controlled shutter in a single lens reflex camera provided with a TTL light measuring system.

A further object of the present invention is to provide a mechanism of the above nature characterized by its reliability, simplicity, ruggedness, versatility and adaptability.

The above and other objects of the present invention will become apparent from a reading of the following description taken in conjunction with the accompanying drawings which illustrate a preferred embodiment thereof.

In a sense the present invention contemplates the provision of a camera comprising an objective, a light measuring network including a photocell exposed to light traversing said objective, a shutter, a memory device for storing an electrical parameter which is a function of the light incident on said photocell, and shutter timing means responsive to said electrical parameter, switching means for alternatively coupling said memory device to said light measuring network or to said shutter timing means, and means motivated attendant to the initiation of a camera photography sequence for actuating said switching means to couple said memory device to said shutter timing means. In its preferred form the camera is a single lens reflex camera including a mirror swingable between an advanced position reflecting the objective traversing light to a view finder and toward a photocell, or carrying the photocell, and a retracted position blocking the photocell and permitting the image to be incident on the film plane. A pivoted actuating lever loaded with the cocking of the camera shutter urges the mirror to a retracted position. The release of the actuating lever causes the retraction of the mirror and effects the stopping down of the automatic objective preset diaphragm and the opening of the shutter. The memory device is normally connected through a double throw first switch to the light measuring network and a network energizing battery is connected through a normally open second switch to the networks. A swingable member releasably locks the actuating lever in its loaded position and actuates the switches during movement to a release position to sequentially close the second switch and then actuate the first switch to connect the memory device to the timing network. The closing of the shutter effects the return of the mirror, actuating lever, lock member and switches to their initial positions.

The operation of the subject switch system is accomplished in driving connection with camera members which control the withdrawal movement of the light responsive element or the swing-up movement of the mirror, so that the operation is positively performed to memorize the object brightness at an instant immediately before the photographing operation to thereby provide the proper exposure time.

The improved network switching mechanism is simple rugged and highly reliable and overcomes the drawbacks and disadvantages of the earlier arrangement.

BRIEF DESCRIPTION OF THE DRAWINGS

FIG. 1 is an elevational view and block diagram of a camera operation control mechanism embodying the present invention, the mechanism being illustrated following a photographing sequence;

FIG. 2 is a view similar to FIG. 1, illustrating the mechanism in a cocked condition; and FIG. 3 is a view similar to FIG. 1, illustrating the mechanism upon release of the shutter.

DESCRIPTION OF THE PREFERRED EMBODIMENT

Referring now to the drawings which illustrate a preferred embodiment of the present invention, the reference numeral 1 generally designates the camera shutter operational network which includes an energizing battery 2 and comprises a light responsive section 1a containing a light receiving element or photocell, an equalizing circuit 1b connected thereto, a photographing condition section 1c and an equalizing circuit 1d connected thereto, a computing circuit 1e to which are applied the combined outputs of the equalizing circuits 1b and 1d, a memory circuit 1f for temporarily memorizing an electric amount corresponding to the object brightness which results from the computation carried out by said computing circuit 1e, and a timing circuit 1g which operates in response to the memorized value of the memory circuit 1f. It should be noted that network 1 individual sections are known and do not, per se, constitute the present invention.

The associated camera includes a mirror box 3, a charge member 4 which performs a reciprocating movement in the direction of the arrow in driving connection with the camera shutter charge or a film winding mechanism, and a charge lever 5 of a well-known mirror quick-return mechanism, the charge lever 5 being, together with a mirror-lifting or retracting lever 7, pivoted to the mirror box 3 through a shaft 6. The charge lever 5 and the mirror lifting lever 7 are co-operatively coupled by a mirror lifting or retracting spring 11 and a spring securing pin 10 mounted on lever 5. The charge lever 5 is urged counterclockwise as viewed in the drawing by a return spring 8, and is limited to a fixed counterclockwise position through the mirror lifting lever 7 engageable by a stop 12 secured to the mirror box 3. The arm portion 5a of the charge lever 5 lies in the path of the charge member 4. One end portion of the mirror lifting lever 7 is provided with a groove 7a. A mirror seat or backing plate 14 rotatably supported by a shaft 15 has an ear portion 14a to which is fixed a pin 16. The pin 16 passes through a slot 3a of the mirror box 3 and engages groove 7a.

The mirror seat 14 supports a mirror 13 and the mirror 13 is limited to an advance predetermined position intercepting the light path by a stop 17. One arm portion 7b of the mirror lifting lever 7 engages a diaphragm coupling member 34 so as to be in driving connection with the diaphragm driving mechanism of an automatic preset diaphragm (not shown). Another arm portion 7c is so arranged that it engages and actuates a leading screen holding member 35 at the end of the clockwise or upward swing of the mirror lifting lever 7.

A lock lever 18 is pivoted to the mirror box 3 by a shaft 19 and is urged clockwise by a spring 20, to a position limited by a stop 21. One end portion of lock lever 18 is formed into a hook portion 18a which releasably engages a pin 9 which is fixed to the charge lever 5 and which serves also as a spring securing member. The other end portion 18b is positioned within the path of movement of a release member 22 which performs a reciprocating movement at the termination of the shutter lagging screen run in the direction of the arrow in driving connection with the movement of the shutter lagging screen.

A four-armed engaging lever 23 is pivoted to the mirror box 3 by a shaft 25 and is urged counterclockwise by a spring 26 to a position limited by a stop 27. The end edge of the arm portion 23a of engaging lever 23 is formed into an arcuate curve concentric with shaft 25. The arm portion 23a is so arranged as to releasably engage an abutment or engaging member 24 fixed to the mirror lifting lever 7. When the springs 8 and 11 are tensioned, that is, when the mirror lifting mechanism is in charged condition, the mutual engagement of the arm portion 23a and the engaging member 24 prevents the mirror lifting lever 7 from performing the mirror swing-up or retraction operation. Other arm portions 23b and 23c are provided respectively with electrically insulating pins 28 and 29 which are so arranged as to be adjacent respectively to a current source switch 31 and a double throw switch 32 of the memory circuit 1f, both switches being arranged on an insulating board 33. Still another arm portion 23d of the engaging lever 23 abuts against a release member 30 which is vertically reciprocatable.

The pins 28 and 29 and the switches 31 and 32 are relatively so positioned that, due to clockwise swing of the engaging lever 23, first the current source switch 31 is closed and then the switch 32 of the memory circuit 1f changes over the electric shutter operation circuit from the computing circuit 1e to the timing circuit 1g. The numeral 36 denotes a film surface.

The operation of the camera described above is as follows:

Under the conditions shown in FIG. 1, where the camera has finished a photographing operation, a film winding operation for the next photographing operation is started. The charge member 4 moves to the left in driving connection with the film winding operation and engages the end portion 5a of the charge lever 5, and swings the charge lever 5 clockwise against the action of the return spring 8. At this time, the engaging member 24 of the mirror lifting lever 7 abuts the end of arm portion 23a of the engaging lever 23 so that the mirror lifting lever 7 is prevented from swinging clockwise. Accordingly, the swing of the charge lever 5 tensions the mirror lifting spring 11. At the end of this operation, the spring securing pin 9 of the charge lever 5 abuts and passes along the inclined surface of the lock lever 18 and causes the lever 18 to be swung counterclockwise against the action of the spring 20. As a result, the pin 9 comes into engagement with a hooked portion 18a. Thus a film winding and shutter charging operation is completed and the charge member 4 returns to the right. The charge lever 5 remains in the swung position with the spring securing pin 9 engaging the hooked portion 18a of the lock lever 18 and the return spring 8 and the mirror lifting spring 11 in tensioned state (FIG. 2). Thus the preparatory operation for photographing has been completed.

The photographing operation is initiated as follows: When the release member 30 is depressed, the release member 30 abuts against the arm portion 23d of the engaging lever 23 and swings the engaging lever 23 clockwise against the action of the spring 26. This swing of the engaging lever 23 first causes the current source switch 31 to be closed to energize electric shutter operation circuit 1. At this time in the operation circuit 1, the switch 32 of the memory circuit 1f is still closed on the side of the computing circuit 1e. Accordingly, the object light rays passing the camera objective produces an electrical quantity, for example a resistance value, corresponding to the brightness, through the light responsive section 1a; while photographing conditions other than object brightness, such as the set diaphragm value or the sensitivity value of the film used, produce a similar electrical quantity through the photographing condition section 1c comprising for example a variable resistor. These two electrical quantities are coupled through equalizing circuits 1b and 1d, respectively, to the computing circuit 1e, where an electric parameter corresponding to proper exposure is computed. An information output resulting from this computation is sent through the switch 32 to the memory circuit 1f, where the output is memorized as an electrical quantity.

Further depression of the release member 30 causes lever 23 to swing clockwise which causes the switch 32 to disconnect the computing circuit 1e from the memory circuit 1f. At this time the memory circuit 1f has stored an electric quantity corresponding to the object brightness. The aforementioned operation of the switch 32 causes the timing circuit 1g to be connected to the memory circuit 1f so that the electric quantity stored in the memory circuit 1f is transferred to and controls the timing circuit 1g.

When the release member 30 is fully depressed, the arm portion 23a of engaging lever 23 is disengaged from abutment member 24 and releases the mirror lifting lever 7 which swings clockwise through the action of the loaded mirror lifting spring 11 until it abuts against the spring securing pin 10 of the charge lever 5 and is stopped (FIG. 3).

As a result of this movement of the mirror lifting lever 7, the under surface of the arm portion 23a of the engaging lever 23 engages the arcuate portion 24a of the engaging member 24. Thus the engaging lever 23 is held at the position shown in FIG. 3 following its swing due to the action of the release member 30 by the clockwise swing of mirror lifting lever 7. Thus, with the mirror lifting lever 7 being swung up, the current source switch 31 remains closed and the switch 32 is retained in a state connecting memory device 1f to the timing circuit 1g. Because of such state, it is not necessary to retain the release member 30 in depressed state. No influence is exerted upon the camera action mechanism and the operation circuit when the shutter button is released and the member 30 returns upward to the position as shown in FIG. 1.

When the mirror lifting lever 7 is swung up, the arm portion 7b pushes down the diaphragm coupled member 34 (as seen in FIG. 2) to actuate a diaphragm driving mechanism (not shown) so that the diaphragm of the camera objective is stopped down to the predetermined aperture. At the same time, through the pin 16 engaging the groove 7a, the mirror screen is swung counterclockwise about the shaft 15. Thus, there is established a photographing light path to the film surface 36, while the light rays to the veiwfinder system is blocked. However, since the transformed electric quantity produced by the light responsive section 1a is stored in the memory circuit, the blocking or masking of light rays incident on the light responsive section 1a due to the action of said mirror 13 has no influence upon electric shutter operation. Further, at the end of the swinging movement of the mirror lifting lever 7, the arm portion 7c thereof acts upon the leading screeen holding member 35 and causes the release of the shutter leading screen and the opening of the shutter. After the lapse of an exposure time determined by the timing circuit 1g in response to the object brightness and other photographing conditions and as controlled by the memory device 1f, the shutter lagging screen is released and caused to run to close the shutter and the photographing operation is completed.

At the end of the lagging screen run, the release member 22, which moves in driving connection with the lagging screen, abuts against the lock lever 18 and moves to the left to swing lock lever 18 counterclockwise against the action of the spring 20, thereby causing the hooked portion 18a to disengage the spring securing pin 9 of the charge lever 5. Accordingly, the charge lever 5 swings, cooperating with and together with the mirror lifting lever 7, counterclockwise until it is stopped through abutment against the stop 12. The release member 22 returns to its original position after completion of its action upon the lock lever 18.

Due to the return movement of the mirror lifting lever 7, the mirror 13, which has withdrawn from the photographing light path, swings clockwise 3 through the action of the pin 16. Owing to the return movements of the arm portions 23b and 23c in the counterclockwise direction, the diaphragm coupling member 34 and the leading screen holding member 35 effect respective return movements, so that the mechanism returns to a state where the automatic diaphragm is fully open and the leading screen is held (FIG. 1). The arm portion 23a of the engaging lever 23 is disengaged from the arcuate portion 24a of the engaging member 24, so that the engaging lever 23 swings counterclockwise due to the action of the spring 26 and is held by the stop 27 at the fixed position as shown in FIG. 1, being ready to again engage the abutment member 24. Due to the actions of the insulating pins 28 and 29, the current source switch 31 is opened, and the switch 32 of the memory circuit 1f is changed over to the computing circuit 1e. Thus the operation circuit is returned to the state of FIG. 1 and is ready to perform the next photographing operation.

In the camera mechanism described above, the change-over of the switch 32 of the memory circuit 1f is carried out in driving connection with the engaging lever 23 upon mirror lifting operations. In a single lens reflex camera where the mirror swing-up action is made in driving connection with a diaphragm stop-down action, the same result as explained above is achieved by directly coupling said switch 32 to the lever which holds the diaphragm stop-down action.

In the foregoing embodiment, the improved mechanism was described in connection with a TTL light measuring system where the light responsive section 1a receives the light rays reflected by the mirror. Also, in a TTL light measuring system where the light rays passing through the mirror is received, the same switch arrangement as that of the foregoing example can be employed for the memory circuit change-over.

In general TTL light measuring systems, including those for single lens reflex cameras, where the light rays passing through the objective is directly received, arrangement is generally so made that prior to opening of the shutter the light receiving element is withdrawn from the photographing light path. In this case the same result as that of the switch 32 of the memory circuit 1f of the specifically described embodiment can be obtained by coupling the change-over switch to the engaging plate which holds the light receiving element at the light measuring position. In the aforementioned example, the switch 32 is automatically changed over to the computing circuit after completion of photographing operation. Such change-over operation is not necessarily automatically performed. This may be performed also in driving connection with shutter charge operation or The film winding operation for the next photographing operation, Thus, according to the present invention, in a TTL type camera having a light responsive element for measuring object light rays passing through the objective and an electric shutter controlled through a memorized electrically transformed parameter in response to the object brightness, the switch operation for change-over of the memory circuit from the computing circuit to the timing circuit is performed through such camera mechanical operations as the actions of the diaphragm or mirror holding member of the holding member for the withdrawal movement of the light responsive element. Accordingly, the electrically transformed value according to the object brightness can be stored in the memory circuit in an accurate manner, the abrupt change of light incident upon the light responsive element due to withdrawal of the mirror or the element itself has no influence upon determination of exposure time by the timing circuit, and the object brightness of the time immediately before photographing operation can be memorized. Therefore, the result of TTL light measuring system can be fully obtained and proper film exposure can be always performed. Further, the action of the switch of the electric shutter operation circuit is carried out in driving connection with said camera mechanical operation members, especially aforementioned members moving during shutter release action, so that the operation circuit can be kept in a properly operating state for the necessary time.

While there has been described and illustrated a preferred embodiment of the present invention, it is apparent that numerous alterations, omissions and additions may be made without departing from the spirit thereof. What is claimed is:

I claim:

1. In a camera comprising an objective, a light measuring network including a photocell exposed to light transversing said objective, a computer network for producing an electrical parameter which is a function of the light incident on said photocell, a shutter operating mechanism, a memory device for storing said electrical parameter, shutter timing means responsive to said electrical parameter, switch means for alternatively coupling said memory device to the output of said computing means or to said shutter timing means, means including a retaining member for releasably holding a movable element of said shutter operating mechanism in a shutter cocked position, means driven by said retaining member attendent to the release of said movable element for actuating said switch means to an advanced position coupling said memory device to said shutter timing means, a lagging shutter closing screen and means driven by the closing movement of said screen for retracting said switch means.

2. The camera of claim 1 including a mirror swingable between an advanced viewing position and a retracted photographing position, said retaining member releasably holding said mirror in said advance position.

3. The camera of claim 1 including an automatic diaphragm movable between an advanced viewing position and a retracted photographing position, said retaining member releasably holding said diaphragm in said advanced position.

4. The camera of claim 1 wherein said photocell is movable between an advance exposed position and a retracted unexposed position and said retaining member releasably holds said photocell in said advanced position.

5. The camera of claim 1, including means driven by said shutter driving mechanism for retracting said switch means with the cocking of said shutter.

6. The camera in accordance with claim 1 comprising means for energizing said network and shutter timing means including a voltage source and a second switch movable between an opened and closed condition and connected in series with said voltage source to said network and shutter timing means and means actuated by said switch means actuating means for closing said second switch prior to said actuation of said switch means.

7. The camera in accordance with claim 6 wherein said second switch is closed by said actuating means while said switch means couples said light measuring network to said memory device.

8. The camera of claim 6 including means responsive to the termination of the camera exposure sequence for returning said switch actuating means to a condition opening said second switch.

* * * * *